(12) United States Patent
Takechi et al.

(10) Patent No.: US 6,463,348 B1
(45) Date of Patent: Oct. 8, 2002

(54) PROCESS CONTROL DEVICE AND PROCESS CONTROL METHOD ENABLING RESTORATION OF LOT CONTROL

(75) Inventors: Ryuji Takechi, Hyogo (JP); Yasuhiro Marume, Hyogo (JP); Masaki Ootani, Hyogo (JP); Takamasa Inobe, Hyogo (JP); Katuya Oota, Hyogo (JP); Yasuhiro Satou, Hyogo (JP)

(73) Assignees: Mitsubishi Denki Kabushiki Kaisha, Tokyo (JP); Ryoden Semiconductor System Engineering Corporation, Hyogo (JP)

( * ) Notice: Subject to any disclaimer, the term of this patent is extended or adjusted under 35 U.S.C. 154(b) by 0 days.

(21) Appl. No.: 09/354,576

(22) Filed: Jul. 16, 1999

(30) Foreign Application Priority Data

Feb. 19, 1999 (JP) ............................. 11-041319

(51) Int. Cl.$^7$ ............................................. G06F 19/00
(52) U.S. Cl. ..................... 700/115; 700/99; 700/100; 700/108; 700/110; 700/121
(58) Field of Search ................................. 700/108, 109, 700/110, 121, 99, 114, 100, 101, 102, 115, 116

(56) References Cited

U.S. PATENT DOCUMENTS 5,696,689 A * 12/1997 Okumura et al. ........... 700/121
5,898,588 A * 4/1999 Morimoto ................... 700/108
6,226,563 B1 * 5/2001 Lim ............................ 700/121
6,304,791 B1 * 10/2001 Kim ............................ 700/121

FOREIGN PATENT DOCUMENTS

JP          6-290085        10/1994

* cited by examiner

Primary Examiner—Maria N. Von Buhr
Assistant Examiner—Ryan Jarrett
(74) Attorney, Agent, or Firm—McDermott, Will & Emery

(57) ABSTRACT

A process control device for controlling a processing device and a transport apparatus while updating process information of a lot includes: a control information update unit to update control information for controlling the processing device and the transport apparatus; a work-in-process information update unit to update the work-in-process information indicating a location of a lot; a processing device control unit to control the processing device according to the control information updated by the control information update unit and the work-in-process information updated by the work-in-process information updated unit; and a transport apparatus control unit to control the transport apparatus according to the control information updated by the control information update unit and the work-in-process information updated by the work-in-process information update unit. The control information update unit deletes, when trouble occurs, the control information of a lot that is in process at a location where the trouble occurred. Thus, it is possible to release the lot from control of the process control device, and to prevent control of other lots from being restricted.

7 Claims, 11 Drawing Sheets

FIG.5

| PRODUCT TYPE AA-A | |
|---|---|
| STEP 11 | CONTROL 11-A |
| STEP 12 | CONTROL 12-A |
| STEP 21 | CONTROL 21-A |
| STEP 22 | CONTROL 22-A |
| STEP 23 | CONTROL 23-A |
| STEP 31 | CONTROL 31-A |
| | |

| PRODUCT TYPE BB-A | |
|---|---|
| STEP 11 | CONTROL 11-A |
| STEP 13 | CONTROL 13-A |
| STEP 21 | CONTROL 21-A |
| STEP 22 | CONTROL 22-A |
| STEP 24 | CONTROL 24-A |
| STEP 31 | CONTROL 31-A |
| STEP 41 | CONTROL 41-A |

| PRODUCT TYPE CC-A | |
|---|---|
| STEP 11 | CONTROL 11-A |
| STEP 13 | CONTROL 13-A |
| STEP 22 | CONTROL 22-A |
| STEP 23 | CONTROL 23-A |
| STEP 31 | CONTROL 31-A |
| STEP 32 | CONTROL 32-A |
| | |

PROCESS CONTROL DEVICE AND PROCESS CONTROL METHOD ENABLING RESTORATION OF LOT CONTROL

BACKGROUND OF THE INVENTION

1. Field of the Invention

The present invention relates to a process control technique for use in production management of semiconductor devices, liquid crystal substrates and the like, and more particularly, to a process control device and a process control method for restoring control of a lot that has become out of control due to trouble in a processing device or a transport apparatus, an operation error, or the like.

2. Description of the Background Art

In recent years, most semiconductor devices and liquid crystal substrates have been manufactured automatically. Thus, the function of a process control device controlling such process largely affects the production efficiency. Generally, production management in a production line is done by causing a process control device to memorize reference information such as processing orders and processing conditions of products for each kind of product, and to control those processing orders and conditions according to the reference information.

In a conventional process control device, however, when processing of a lot becomes impossible due to, for example, trouble in a processing device or a transport apparatus, an operation error or the like, a large amount of time as well as a number of technicians having expertise in process control have been needed for restoring lot control. That is, a plurality of technicians having expertise including knowledge in process control required for restoring the lot control and knowledge in physical distribution of lots have exchanged various kinds of information with one another to modify each information registered with the process control device so as to restore the lot control.

The out of control lot has also affected other lots, and has posed a problem that the process control device cannot control the other lots, either.

SUMMARY OF THE INVENTION

An object of the present invention is to provide a process control device that prevents an out of control lot from affecting other lots.

Another object of the present invention is to provide a process control device capable of readily restoring control of the lot that has been out of control.

Yet another object of the present invention is to provide a process control method preventing an out of control lot from affecting other lots.

A still another object of the present invention is to provide a process control method capable of readily restoring control of the lot that has been out of control.

According to an aspect of the present invention, a process control device that controls a processing device and a transport apparatus while updating progress information of a lot includes: a control information update unit to update control information for use in control of the processing device and the transport apparatus; a work-in-process information update unit to update work-in-process information representing the location of a lot; a processing device control unit to control the processing device according to the control information updated by the control information update unit and the work-in-process information updated by the work-in-process information update unit; a transport apparatus control unit to control a transport apparatus according to the control information updated by the control information update unit and the work-in-process information updated by the work-in-process information update unit; and a control information deleting unit to delete, when trouble occurs, the control information of a lot that is in process at a location where the trouble occurred.

Since the control information deleting unit deletes the control information of the lot that is under manufacturing at the location of the trouble, it becomes possible to release the target lot from control of the process control device, and to prevent control of other lots from being restricted.

According to another aspect of the present invention, a process control method for controlling a processing device and a transport apparatus while updating progress information of a lot includes the steps of: updating control information for use in control of the processing device and the transport apparatus; updating work-in-process information representing the location of a lot; controlling the processing device according to the updated control information and the updated work-in-process information; controlling the transport apparatus according to the updated control information and the updated work-in-process information; and deleting, when trouble occurs, the control information of a lot that is in process at a location where the trouble occurred.

Since the control information of the lot that is under manufacturing at the location of the trouble is deleted, it is possible to release the lot in question from the process control. Thus, control restrictions on other lots are prevented.

The foregoing and other objects, features, aspects and advantages of the present invention will become more apparent from the following detailed description of the present invention when taken in conjunction with the accompany drawings.

BRIEF DESCRIPTION OF THE DRAWINGS

FIG. 5 is a diagram showing an example of reference information.

DESCRIPTION OF THE PREFERRED EMBODIMENTS

Figure 1:
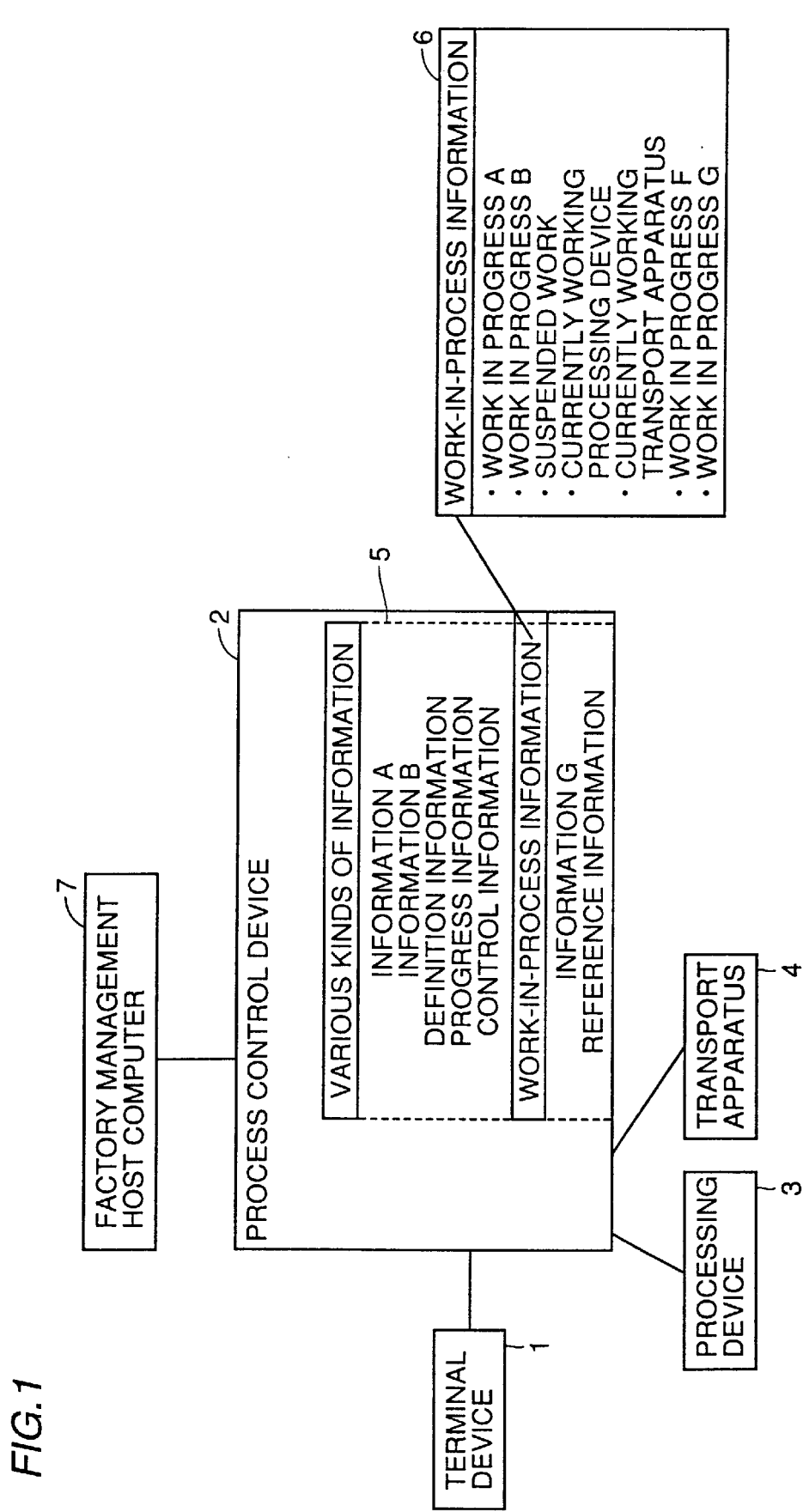
FIG. 1 is a block diagram showing a schematic configuration of a production management system including a process control device according to the present invention.

FIG. 1 is a block diagram showing a schematic configuration of a production management system including a process control device according to an embodiment of the present invention. This production management system includes: a factory management host computer 7 for controlling the entire production management system; a terminal device 1 for operating a process control device 2; process control device 2 for controlling the process; a processing device 3 corresponding to each process step; and a transport apparatus 4 for transporting a lot between the processing devices. Data communication between terminal device 1 and process control device 2 is carried out via LAN (Local Area Network). Process control device 2 is connected to each of processing device 3 and transport apparatus 4 via a serial interface or the like, and controls processing device 3 and transport apparatus 4 by a given communication protocol.

Process control device 2 performs control of physical distribution of a lot (process control) while referring to, generating and updating various kinds of information 5. Those various kinds of information 5 include: definition information consisting of physical information about production equipment, such as processing device 3 and transport apparatus 4, and definitions used in a program for controlling the process; progress information representing a progress situation and a pertinent attribute of a lot; control information for use in control of a process step of a lot in processing device 3 and in control of transportation by transport apparatus 4; and work-in-process information indicating a location and a state of a lot.

The definition information, which is registered in advance, includes information indicating the types and arrangements of processing device 3 and transport apparatus 4. The progress information is automatically updated when a lot enters a process step, when the step starts, when the step ends, when lot transportation starts, and when the lot transportation ends. The progress information may also be updated directly by an operator from terminal device 1. The control information, which is created according to the generation of the progress information, is occasionally updated in response to the changes in the states of control of processing device 3 and transport apparatus 4. The various kinds of information 5 further include information A, information B, information G, and reference information. The contents of these categories, however, are not directly related to the present invention.

The work-in-process information 6 includes information about suspended work, currently working processing device, and currently working transport apparatus. These categories will be described later in detail. Though work-in-process information 6 also includes information about work in progress A, work in progress B, work in progress F, and work in progress G, the contents thereof are not directly related to the present invention.

Figure 2:
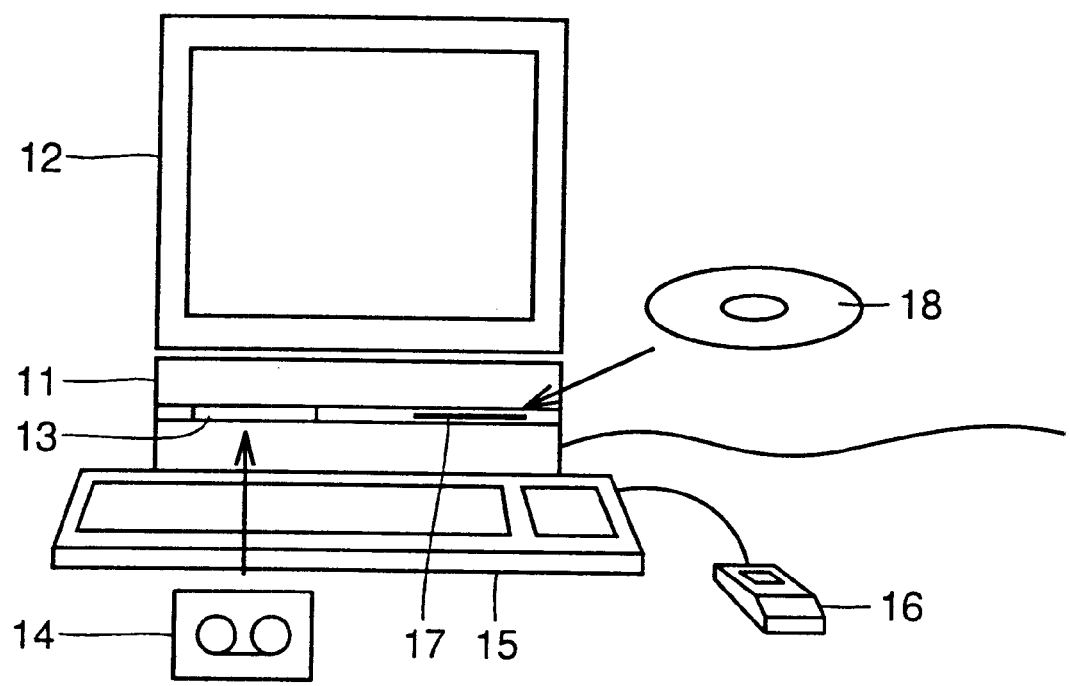
FIG. 2 is a diagram showing an exemplary appearance of the process control device according to the present invention.

FIG. 2 is a diagram showing an exemplary appearance of the process control device of the present invention. The process control device includes: a computer main body 11; a graphic display device 12; a magnetic tape device 13 with a magnetic tape 14 mounted thereon; a keyboard 15; a mouse 16; a CD-ROM (Compact Disc-Read Only Memory) device 17 with a CD-ROM 18 mounted thereon; and a LAN interface 19. A process control program is provided by a storage medium such as magnetic tape 14 and CD-ROM 18. Computer main body 11 executes the process control program to control processing device 3 and transport apparatus 4. The process control program may be provided to computer main body 11 by another computer via a communication line.

Figure 3:
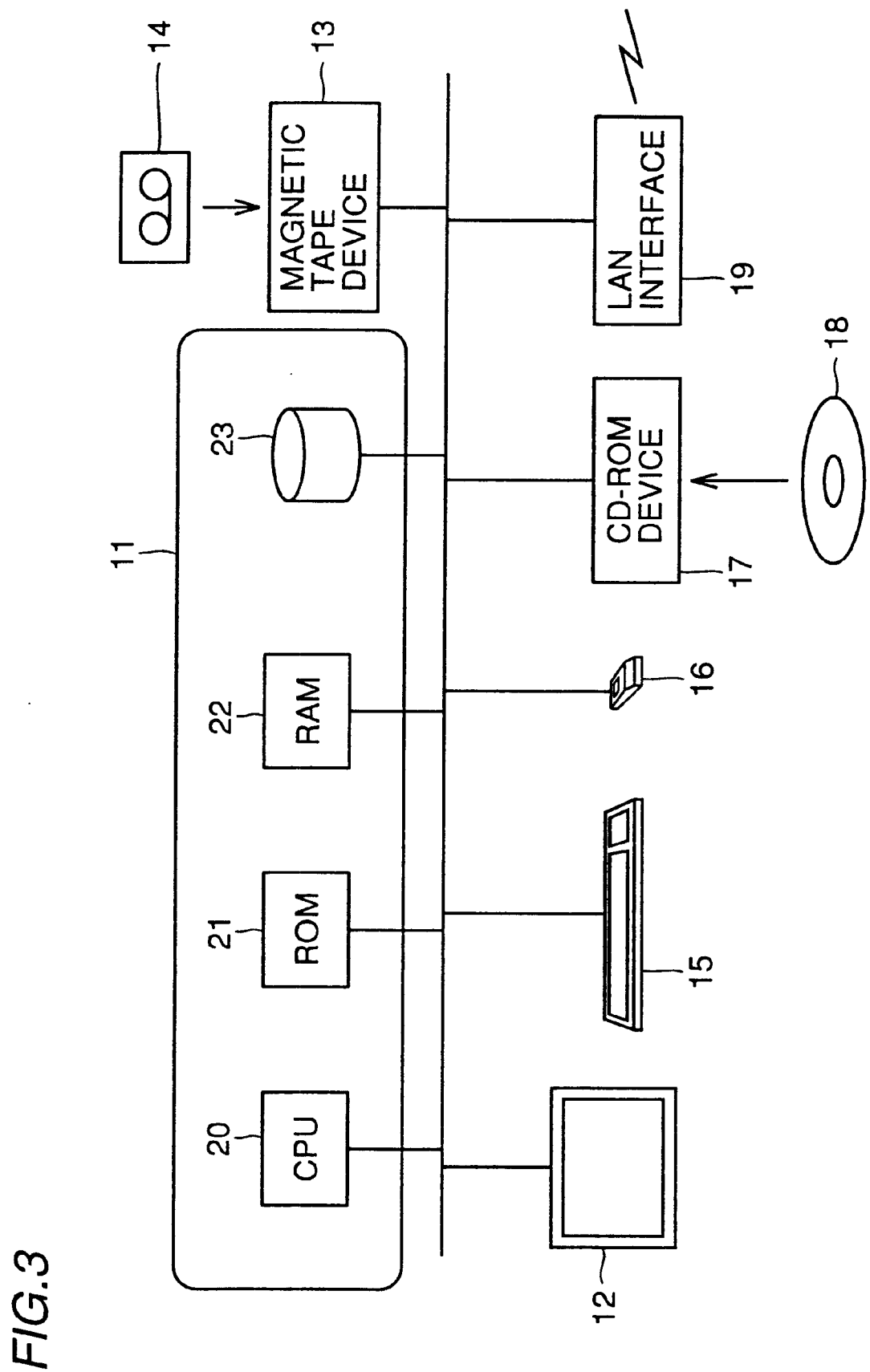
FIG. 3 is a block diagram showing an exemplary configuration of the process control device according to the present invention.

FIG. 3 is a block diagram showing an exemplary configuration of the process control device of the present invention. Computer main body 11 shown in FIG. 2 includes a CPU (Central Processing Unit) 20, a ROM (Read Only Memory) 21, a RAM (Random Access Memory) 22, and a hard disc 23. CPU 20 performs processing while controlling data input/output between itself and graphic display device 12, magnetic tape device 13, keyboard 15, mouse 16, CD-ROM device 17, LAN interface 19, ROM 21, RAM 22, or hard disc 23. The process control program recorded on magnetic tape 14 or CD-ROM 18 is temporarily stored in hard disc 23 via magnetic tape device 13 or CD-ROM device 17 by CPU 20. CPU 20 performs process control by loading the process control program from hard disc 23 to RAM 22 and executing it, as appropriate.

The process control device according to a respective embodiment of the present invention will be described hereinbelow. The appearance of the process control device as shown in FIG. 2 and the schematic configuration thereof as shown in FIG. 3 are common to all the embodiments.

First Embodiment

Figure 4:
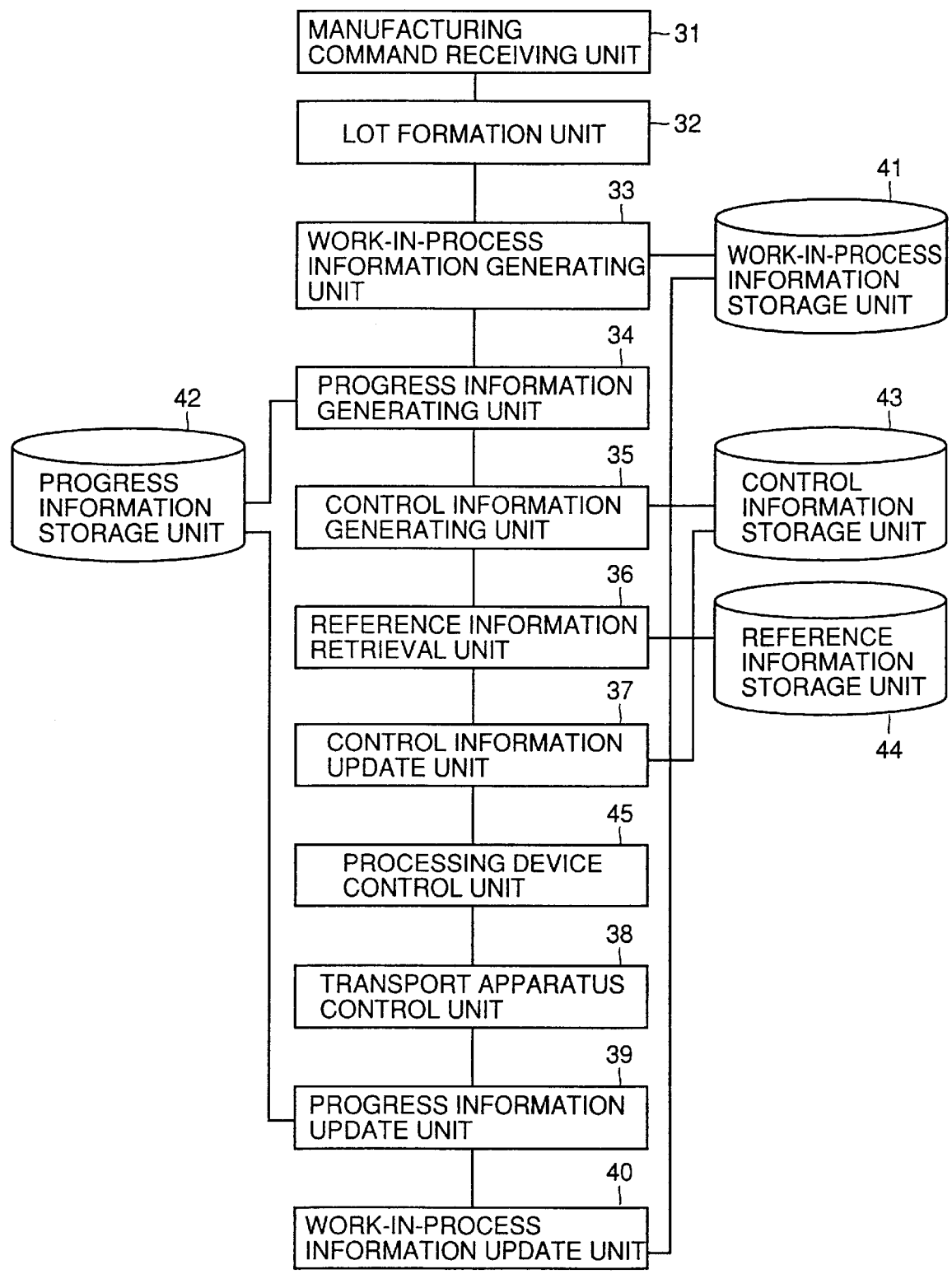
FIG. 4 is a block diagram showing a schematic configuration of the process control device according to a first embodiment of the present invention.

FIG. 4 is a block diagram showing a schematic configuration of the process control device according to the present embodiment. The process control device includes: a manufacturing command receiving unit 31 that receives a manufacturing command from factory management host computer 7; a lot formation unit 32 that performs formation of manufacturing information of respective products from the manufacturing command received by manufacturing command receiving unit 31 (i.e. lot formation); a work-in-process information generating unit 33 that generates work-in-process information of a lot; a progress information generating unit 34 that creates progress information from the manufacturing information of respective products formed by lot formation unit 32 and registers the progress information with a progress information storage unit 42; a control information generating unit 35 that creates control information for use in control of processing device 3 and transport apparatus 4 and stores the control information in a control information storage unit 43; a reference information retrieval unit 36 that retrieves reference information stored in a reference information storage unit 44 to extract control conditions of processing device 3 and transport apparatus 4; a control information update unit 37 that updates the control information according to the changes in the control conditions extracted by reference information retrieval unit 36; a transport apparatus control unit 38 that designates, according to the control information, work-in-process information and definition information, transport apparatus 4 to perform automatic transportation; a progress information update unit 39 that updates the progress information both when transport apparatus 4 starts and ends transportation; a work-in-process information update unit 40 that updates the work-in-process information; and a processing device control unit 45 that designates, according to the control information, work-inprocess information and definition information, processing device 3 to perform processing control.

FIG. 5 is a diagram showing an exemplary configuration of the reference information. Reference information 50 includes product type names 51a to 51c, process step names 52a to 52c, and control condition numbers 53a to 53c. The reference information is defined for every product type 51a–51c. In FIG. 5, three types of products are defined. Process step names 52a to 52c are set according to the processing order of each product. Control condition numbers 53a to 53c are set corresponding to a control condition table that will be described later.

This reference information is transferred from factory management host computer 7 via LAN to process control device 2, and stored in reference information storage unit 44.

Figure 6:
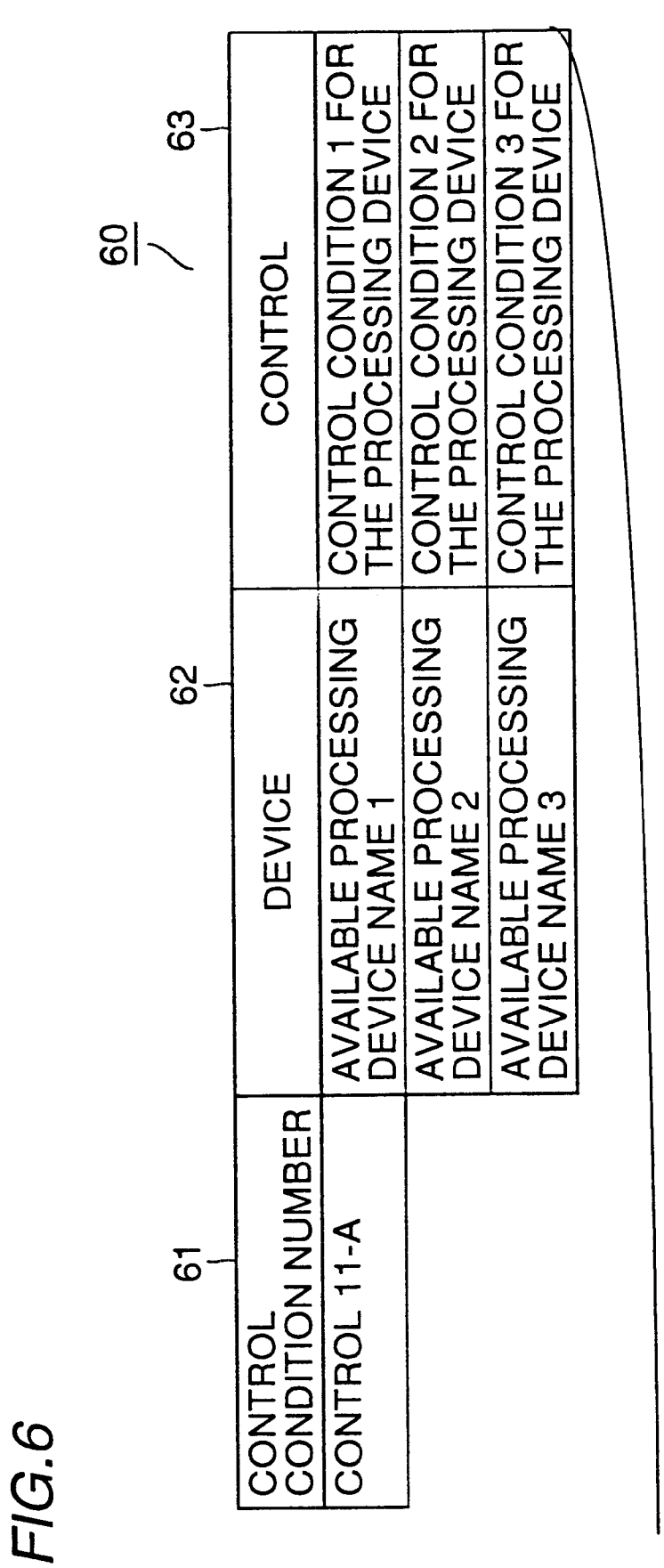
FIG. 6 is a diagram showing an example of a control condition table.

FIG. 6 is a diagram showing an example of the control condition table, which defines control conditions corresponding to a respective control condition number 53a–53c set in the reference information. The control condition table includes: a control condition number 61 (which corresponds to control condition number 53a–53c); a name of processing device that is available for processing of a lot in the corresponding process step (hereinafter, referred to as an "available processing device") 62 (which corresponds to processing device 3 in FIG. 1); and a control condition 63 that is given to the relevant processing device.

Figures 7, 8:
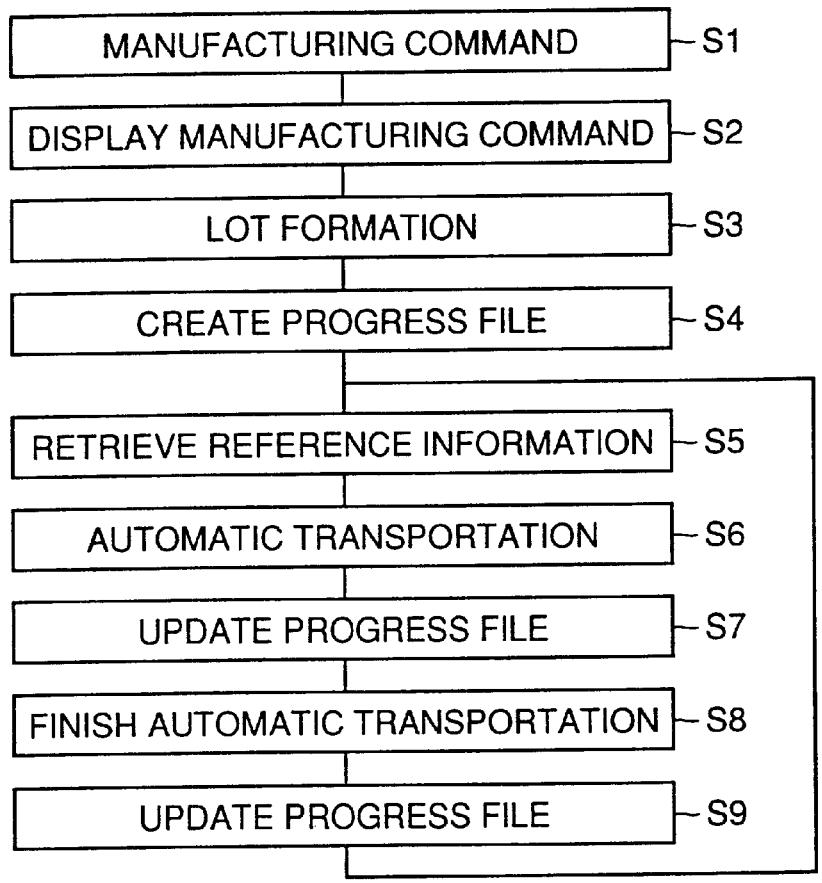
FIG. 7 is a flow chart illustrating a process procedure of the process control device according to the first embodiment of the present invention.
FIG. 8 is a diagram showing an example of progress information.

FIG. 7 is a flow chart illustrating a process procedure of the process control device according to the present embodiment. First, the manufacturing command information is transferred from factory management host computer 7 to process control device 2 via manufacturing command receiving unit 31 (S1). This manufacturing command information includes information corresponding to the number of products to be produced. The manufacturing command information for each product includes a lot number and a type of the product.

Lot formation unit 32 displays on graphic display device 12 the manufacturing command information received by manufacturing command receiving unit 31 (S2). This display screen is displayed using a prescribed format, and the process is proceeded in an interactive manner with an operator. This display screen will be called a lot formation screen hereinbelow. The operator prepares at processing device 3 necessary materials according to the manufacturing command information displayed on the lot formation screen, and enters necessary items (S3). When forming a lot, lot formation unit 32 determines physical conditions (e.g., whether there exists a processing device or a transport apparatus for processing or transportation of the lot) by referring to the definition information. When the physical conditions are not satisfied, it displays an error message or the like to report to the operator.

Work-in-process information generating unit 33 creates work-in-process information and stores it in work-in-process information storage unit 41. This work-in-process information includes: information about processing device 3 currently working on a lot ("currently working processing device"); information about transport apparatus 4 currently working on a lot ("currently working transport apparatus"); and information about a "suspended work" that will be described later.

Progress information generating unit 34 creates progress information for every lot number, from the manufacturing command information and the reference information (S4). FIG. 8 shows an example of the progress information. Progress information 70 includes a lot number, a product type, and a current progress state. Since this lot has not been transported to its first destination yet, the current progress state of this lot reads that it is "to be transported to a first processing device" that is the first destination of the lot. Control information generating unit 35 creates control information from the manufacturing command information and the reference information and stores the control information in control information storage unit 43. This control information is used to control processing device 3 and transport apparatus 4.

Reference information retrieval unit 36 refers to progress information 70 and extracts the product type "AA-A" and the current progress state "step 11" of items having a lot number "12345". It then retrieves the reference information (see FIG. 5) stored in reference information storage unit 44 and detects that the manufacturing condition number is "control 11-A". By referring to the control condition table as shown in FIG. 6, reference information retrieval unit 36 extracts available processing devices' names 62 and control conditions 63 (S5).

Next, transport apparatus control unit 38 selects a processing device for use from available processing devices 62 extracted by reference information retrieval unit 36. Then, referring to the control information, work-in-process information and definition information, it gives a command for automatic transportation to a transport apparatus that is designated to transport the items having lot number "12345" (S6).

When the transport apparatus starts transportation of the lot number "12345", progress information update unit 39 updates the content of the progress information and stores the updated information in progress information storage unit 42 (S7). Work-in-process information update unit 40 updates the "currently working transport apparatus" within the working-process information, and stores the updated information in work-in-process information storage unit 41. When transport apparatus 4 finishes transportation of the lot number "12345" (S8), processing device control unit 45 issues a processing start command to a processing device that has received the lot. Progress information update unit 39 updates the content of the progress information and stores the updated information in progress information storage unit 42 (S9). The process then goes back to step S5 and repeats the above process.

Figure 9:
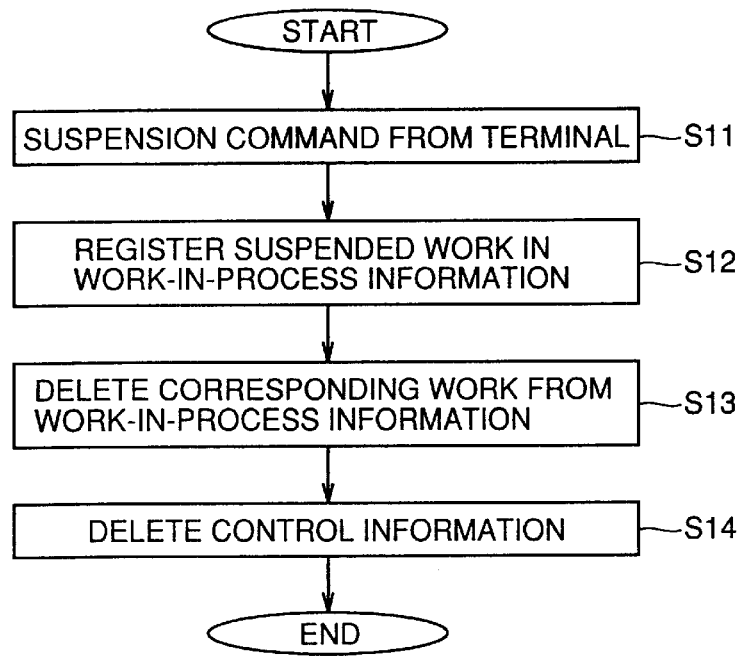
FIG. 9 is a flow chart illustrating a process procedure of the process control device according to the first embodiment of the present invention.

FIG. 9 is a flow chart illustrating the process procedure of the process control device in the case where trouble occurs in processing device 3 or transport apparatus 4. In processing device 3, the trouble arises, for example, before a lot processing (i.e., a command for the processing has been transmitted from process control device 2 to processing device 3, but processing device 3 has not started the processing yet), during the lot processing, or after the lot processing (i.e., the processing of the lot has been completed, but the completion has not been fully reported from processing device 3 to process control device 2 yet).

The trouble arises in transport apparatus 4, for example, before a lot transportation (i.e., a command for the transportation has been transmitted from process control device 2 to transport apparatus 4, but transport apparatus 4 has not started the transportation yet), during the lot transportation, or after completion of the lot transportation (i.e., the lot transportation has been completed, but the completion has not been fully reported from transport apparatus 4 to process control device 2 yet). In addition, the trouble may occur due to an operation error by an operator.

Figure 10:
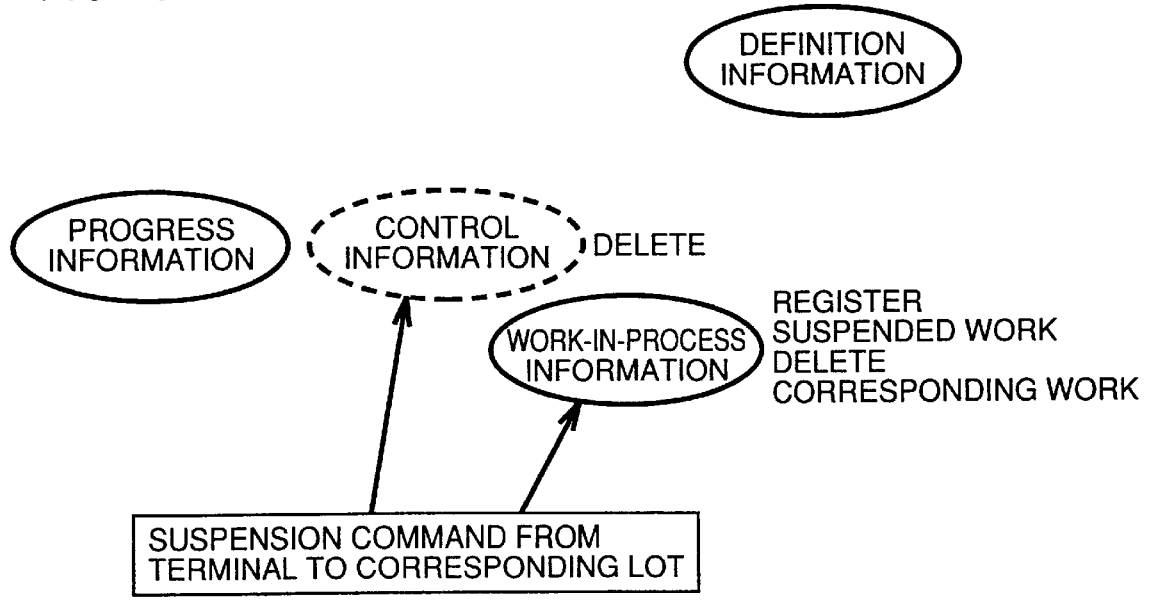
FIG. 10 is a diagram schematically showing the process procedure of the process control device according to the first embodiment.

When such trouble occurs in processing device 3 or transport apparatus 4, the operator first issues from terminal device 1, a command to suspend a work-in-process for a lot that is at a location where the trouble occurred (S11). Upon receipt of the work suspension command for the lot, work-in-process information update unit 40 registers the "suspended work" in the work-in-process information (S12), and deletes the corresponding work (i.e., "currently working processing device" or "currently working transport apparatus") (S13). Control information update unit 37 deletes all the control information for the processing device 3 or the transport apparatus 4 in which the trouble occurred (S14). Thus, when trouble arises, a "suspended work" is registered in the work-in-process information for a lot that is at a location of the trouble, and the corresponding "currently working processing device" or "currently working transport apparatus" is deleted. Accordingly, the lot in question can be released completely from the control of the process control device. Furthermore, it is possible to halt the control of processing device 3 or transport apparatus 4 in which the trouble occurred, by deleting all the control information thereof. The process procedure of the process control device according to the present embodiment is schematically shown in FIG. 10.

When trouble arises in a conventional process control device, processing of a lot at a location of the trouble is halted while the work-in-process information and the control information for the lot are still present, and thus, control of other lots is restricted. Therefore, it has been necessary to modify the data within the process control device, which is extremely time consuming.

According to the process control device of the present embodiment, however, the lot at the location of the trouble can be made completely free from control, so that control restrictions on the other lots are prevented. Further, since the "suspended work" is registered in the work-in-process information, the lot in suspension can readily be retrieved.

Second Embodiment

Figure 11:
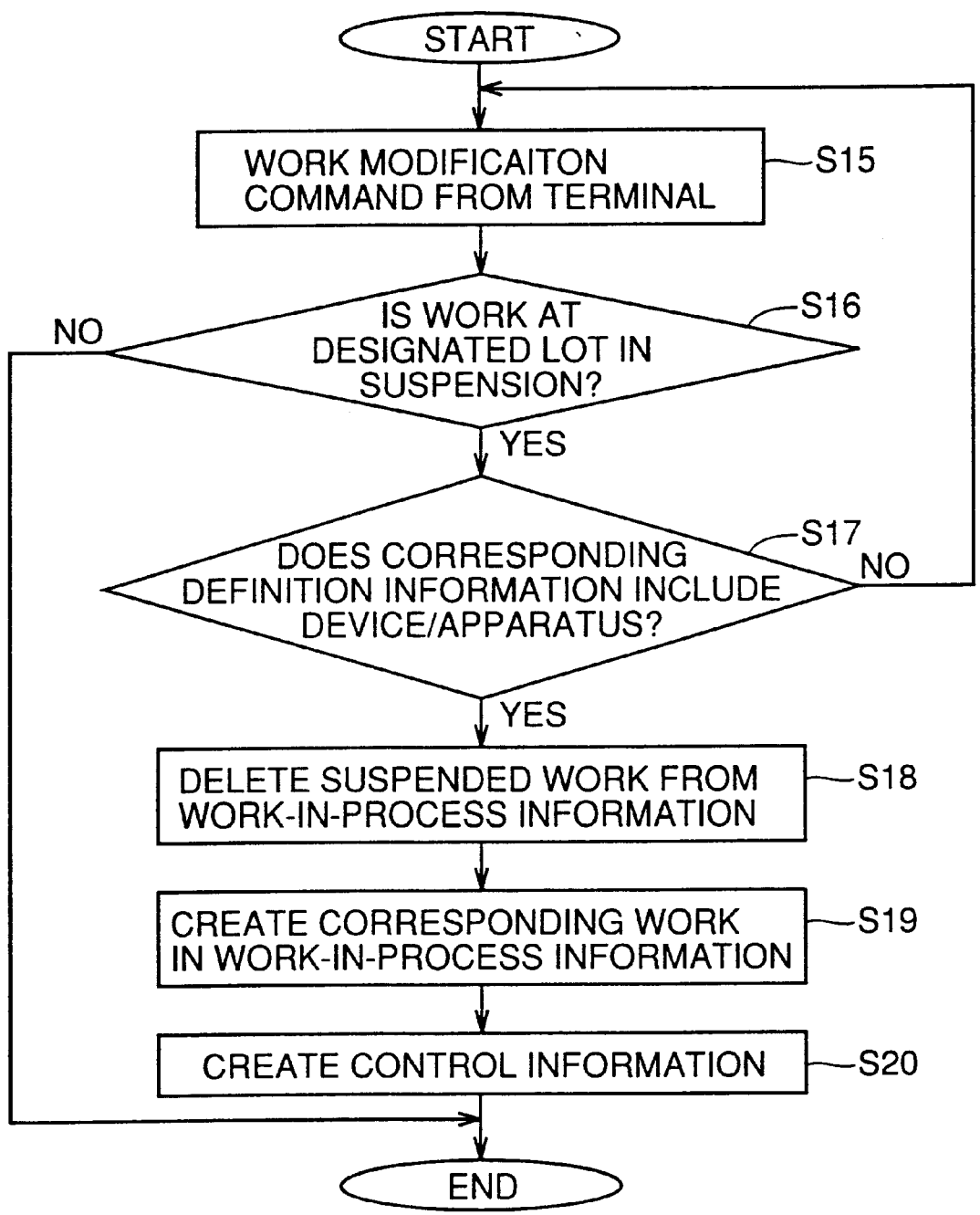
FIG. 11 is a flow chart illustrating a process procedure of the process control device according to a second embodiment of the present invention.

FIG. 11 is a flow chart illustrating a process procedure of the process control device of the present embodiment. The process procedure according to the present embodiment is performed following the process procedure described in the first embodiment as shown in FIG. 9. The schematic configuration of the process control device of the present embodiment is identical to that shown in FIG. 4, and thus, the detailed description of the same configuration and function will not be repeated.

An operator issues from terminal device 1 a command to modify work for the lot at the location where the trouble occurred (S15). This work modification command includes a process step for which restoration of the control is desired, and a location from which the process step is desired to be started (e.g., a work location code to be recorded in the "currently working processing device" information). Upon receipt of the work modification command, work-in-process information update unit 40 retrieves the work-in-process information for the lot in question, and determines whether the lot is in suspension or not (S 16). If not (S 16, No), the process ends without accepting the work modification command. If the lot is in suspension (S16, Yes), work-in-process information update unit 40 refers to the definition information, and determines whether the process step and the location to start the process step are within the facility (S17).

Figure 12:
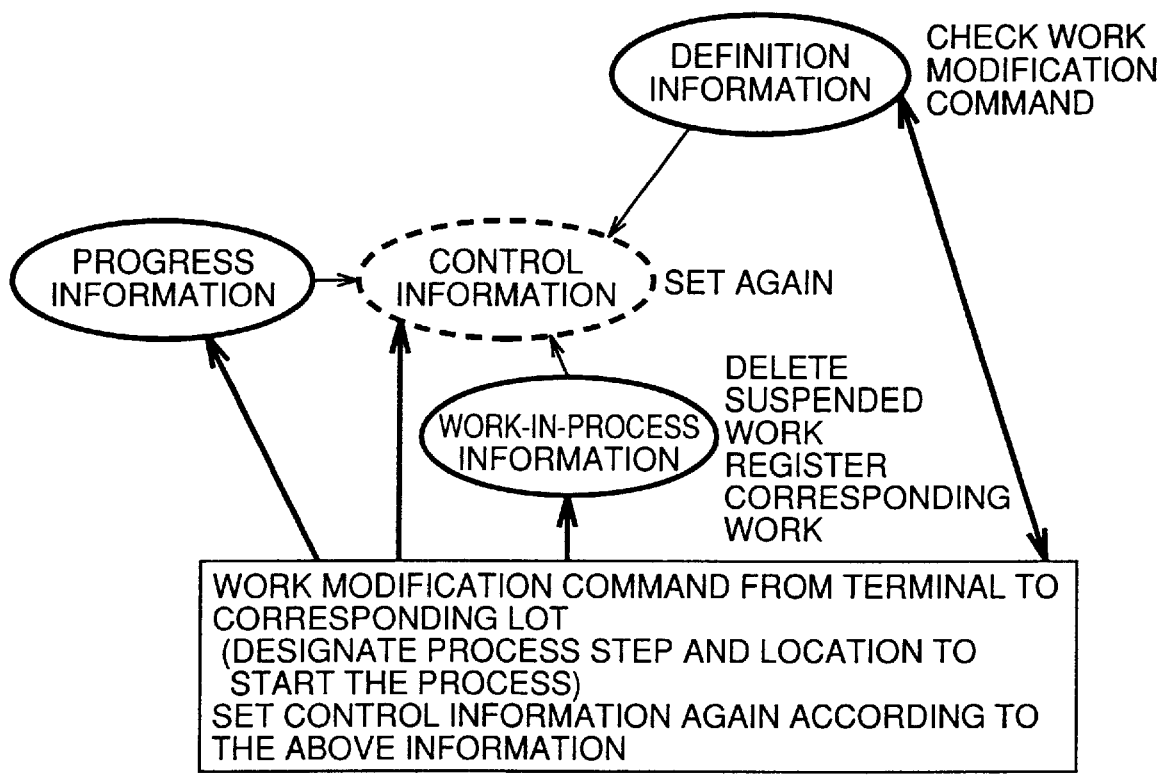
FIG. 12 is a diagram schematically showing the process procedure of the process control device according to the second embodiment.

If the process step and the location to start the process step are not within the facility (S17, No), the work modification command is not accepted, and the process returns to step S15 and repeats the subsequent process. If the process step and the location are within the facility (S17, Yes), work-in-process information update unit 40 deletes the "suspended work" registered in the work-in-process information (S18), and changes the content of the work-in-process information to meet the modified work (S19). Control information generating unit 35 then refers to the progress information and the modified work-in-process information to create new control information (S20). FIG. 12 schematically shows the process procedure of the process control device according to the present embodiment.

As explained above, according to the process control device of the present embodiment, work-in-process information is updated on receipt of a work modification command, and control information is created correspondingly. Thus, it becomes possible to restore control of a lot that is at a location where trouble occurred.

Third Embodiment

Figure 13:
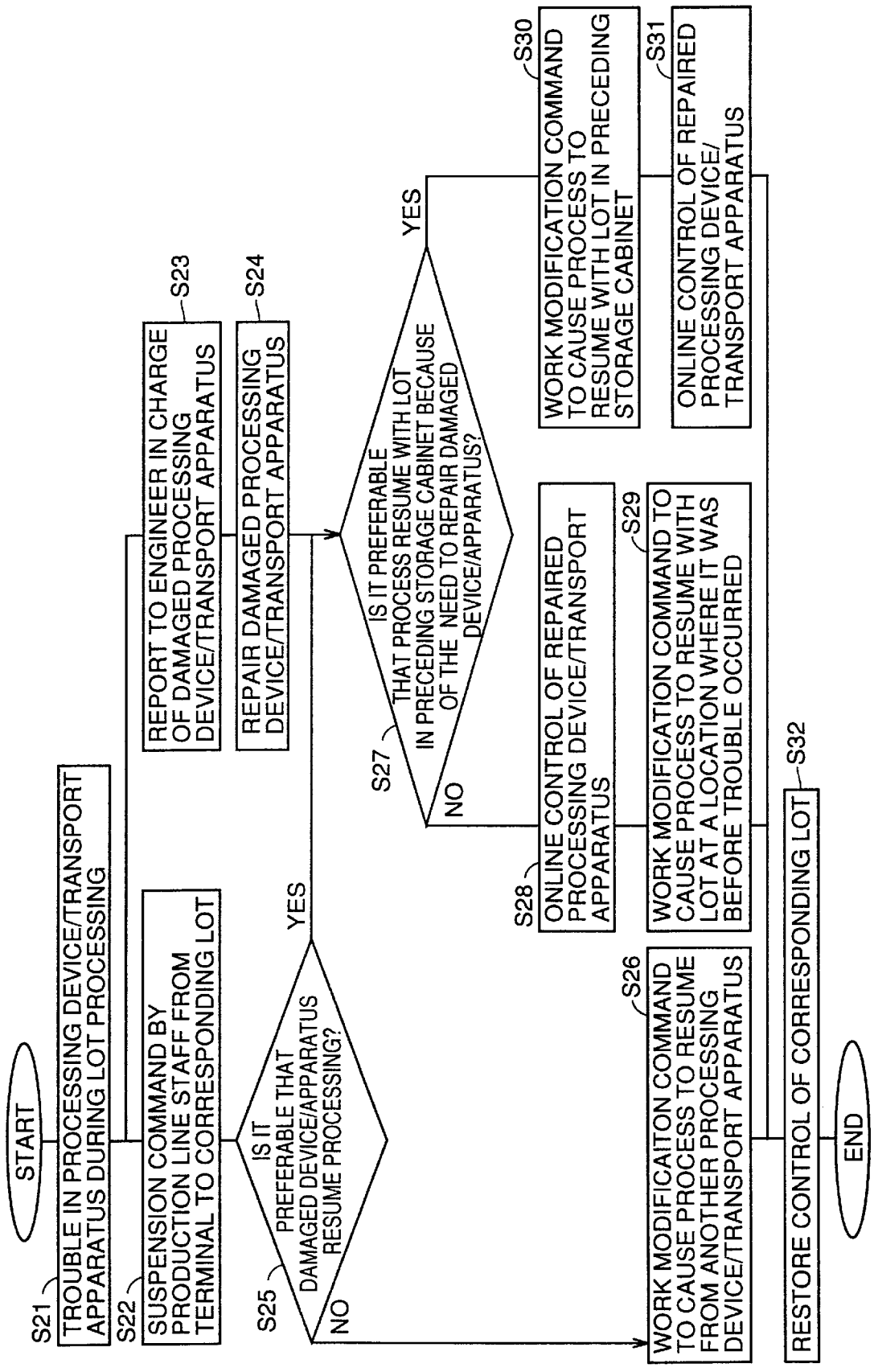
FIG. 13 is a flow chart illustrating a process procedure of the process control device according to a third embodiment of the present invention.

FIG. 13 is a flow chart illustrating a process procedure of the process control device according to the present embodiment. In the process procedure of the present embodiment, the process procedure of the first embodiment shown in FIG. 9 and that of the second embodiment shown in FIG. 11 are employed as appropriate. The schematic configuration of the process control device according to the present embodiment is identical to that shown in FIG. 4, and thus, the detailed description of the same configuration and function will not be repeated.

If trouble arises in processing device 3 or transport apparatus 4 when a lot is in process (S21), an operator issues from terminal device 1 a command to suspend the process on the lot that is at a location of the trouble (S22). At the same time, the operator reports the trouble to an engineer who is responsible for the processing device or the transport apparatus in which the trouble has occurred (S23), and asks the engineer to repair it (S24).

Next, the operator determines whether it is preferred that the damaged processing device or transport apparatus resume processing, depending on the process situation of the unfinished lot (S25). If it is unnecessary to cause the device or apparatus to resume processing of the lot (S25, No), the operator positions the lot at an entry point of another processing device or a position from which it can enter another transport apparatus, and issues from terminal device 1 a corresponding work modification command (S26). The process then goes to step S32.

If it is preferable that the damaged processing device or transport apparatus resume processing of the lot (S25, Yes), the operator determines whether the process of the lot should be resumed from a shelf (hereinafter, referred to as a "storage cabinet") in which the lot has been temporarily stored (S27). This is to adjust for a case where a lot is temporarily moved back to the nearest preceding storage cabinet because of the need to repair a damaged processing device or transport apparatus.

If it is unnecessary to resume processing of the lot from the preceding storage cabinet (S27, No), the damaged processing device or transport apparatus is first repaired and brought to a state that enables online control thereof (S28), and a work modification command is issued from terminal device 1 to cause the process to resume with the lot located at the position where it was when the trouble occurred (S29). The process then goes to step S32. If the process of the lot is to be resumed from the preceding storage cabinet (S27, Yes), the operator issues from terminal device 1 a work modification command to let the process resume with the lot located in the preceding storage cabinet (S30). The damaged processing device or transport apparatus is then repaired and put into a state in which it can be controlled online (S31).

In step S32, the process control device resumes control of the lot.

As explained above, according to the process control device of the present embodiment, it is now possible to restore control of a lot that was in process in a processing device or transport apparatus when trouble occurred therein, from any processing device or transport apparatus present within the definition information.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A process control device to control a processing device and a transport apparatus while updating progress information of a lot, comprising:

a control information update unit to update control information for controlling said processing device and said transport apparatus;

a work-in-process information update unit to update work-in-process information indicating a location of a lot;

a processing device control unit to control said processing device according to the control information updated by said control information update unit and the work-in-process information updated by said work-in-process information update unit;

a transport apparatus control unit to control said transport apparatus according to the control information updated by said control information update unit and the work-in-process information updated by said work-in-process information update unit; and a control information deleting unit to delete, when trouble occurs, control information of a lot that is in process at the location where the trouble occurred.

2. The process control device according to claim 1, further comprising a suspended work registering unit to register a suspended work indicating that a work is in suspension, in work-in-process information of the lot that is in process at the location of the trouble.

3. The process control device according to claim 2, further comprising a control restoring unit to delete the suspended work of the lot registered by said suspended work registering unit and to set again control information for the lot.

4. A process control method to control a processing device and a transport apparatus while updating progress information of a lot, comprising the steps of:

updating control information for controlling said processing device and said transport apparatus;

updating work-in-process information indicating a location of a lot;

controlling said processing device according to said updated control information and said updated work-in-process information;

controlling said transport apparatus according to said updated control information and said updated work-in-process information; and deleting, when trouble occurs, control information of a lot that is in process at a location where the trouble occurred.

5. The process control method according to claim 4, further comprising the step of registering a suspended work that indicates a work is in suspension, in work-in-process information of the lot that is in process at the location of the trouble.

6. The process control method according to claim 5, further comprising the step of deleting said registered suspended work of the lot and setting again control information for the lot.

7. The process control method according to claim 6, further comprising the steps of:

repairing a device corresponding to the location where said trouble occurred;

issuing, when restarting a process from said device corresponding to the location of the trouble, a work modification command to cause the process to restart from said device; and issuing, when restarting a process from a device other than said device corresponding to the location of the trouble, a work modification command to cause the process to restart from the other device.

* * * * *